Figure 1:
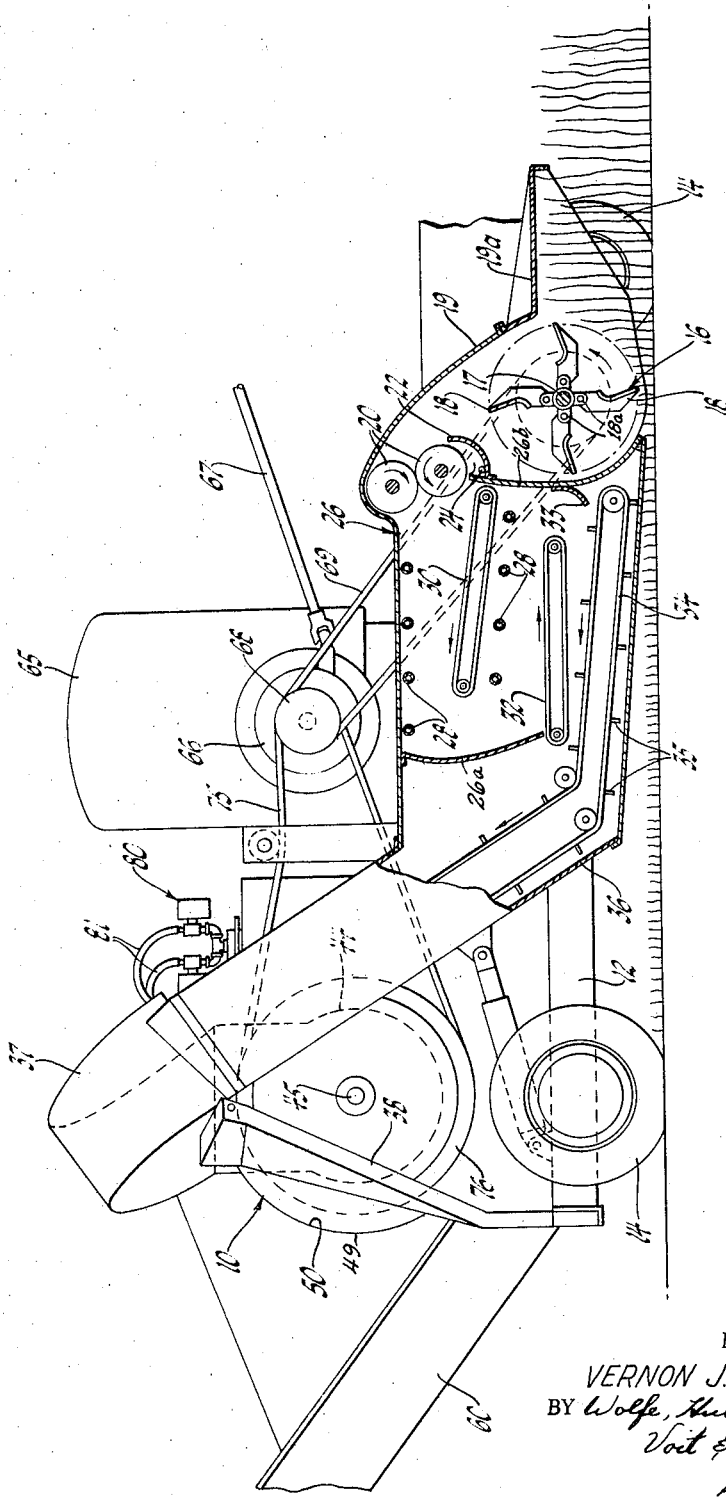

INVENTOR.
VERNON J. LUNDELL
BY Wolfe, Hubbard,
Voit & Osann
ATTORNEYS.

United States Patent Office 3,233,393
Patented Feb. 8, 1966

3,233,393
MACHINE FOR WAFERING STANDING
FORAGE CROPS
Vernon J. Lundell, Cherokee, Iowa, assignor to Massey-Ferguson Services N.V., Curacao, Netherlands Antilles, a corporation of the Netherlands
Filed Aug. 31, 1962, Ser. No. 220,790
3 Claims. (Cl. 56—1)

This invention relates generally to the harvesting and treating of forage crops, and concerns, more particularly, a novel method and machine for the wafering of standing crops.

Of the many operations to be performed on a farm perhaps the most consuming of time, labor and space, are those entailed in harvesting, handling, storing and using forage crops, of which hay is representative. At present the most common practice employed in treating forage crops involves the intial cutting, windrowing and subsequent baling of the crop, or alternatively, simply raking and gathering the loose hay and subsequently stacking it. A relatively recent development in the treating of forage crops comprises the formation of the crop material into pellets or wafers rather than bales. Both of these terms, wafers and pellets, have been employed to denote agglomerated feed formed by compacting their ingredients, and herein the terms are used synonymously. Preparing hay in wafer or pellet form is advantageous because it affords a way for mechanization all the way from the field to the feeders with the resulting saving of time, space and labor.

Practical mobile wafering machines intended primarily for field operation comprise a relatively revent development in agricultural machinery. These machines have been designed not only for compacting forage crop material into wafers but also for picking up the material from the field, chopping it and delivering the commingled or homogenized mass of stems and leaves to the wafering mechanism. Heretofore, however, successful wafering operation has entailed first the cutting of the crop, and then forming it into windrows and then allowing for drying by the action of the sun and the wind until the moisture content becomes sufficiently reduced, usually to 20% or less by weight. Not only is this time consuming and involving of risk of spoilage if the cut hay is wet by rain, but also it entails severe loss of nutrients, e.g. Vitamin A, as a result of leaching.

The present invention lies in the provision of a method for harvesting standing forage crops and forming the same into wafers, which entails the steps of cutting and comminuting the crop material, expressing moisture from the comminuted material, further dehydrating the same by heating and delivering the dehydrated material to a wafering mechanism and compacting it into wafers. The invention also contemplates the provision of a wafering machine intended primarily for field use and which has a wafering mechanism and means for comminuting the crop material and which is characterized by the provision of means for expressing moisture from the comminuted crop material, means for heating the crop material to further dehydrate the same, and means interposed between the heating means and the wafering mechanism for receiving the material from the former and delivering it to the latter wherein the material is compacted into discrete wafers.

Figure 2:
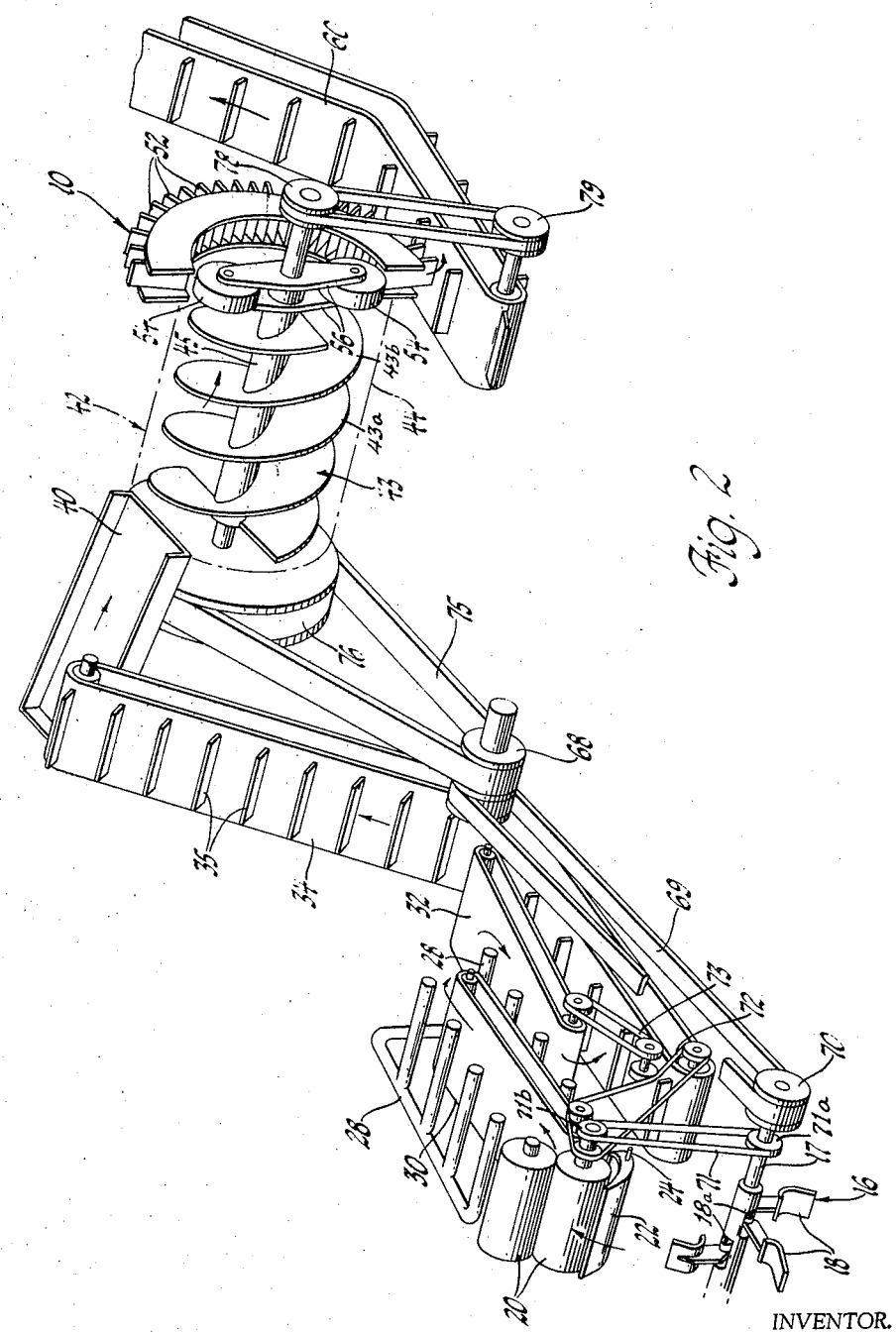

An example of the inventive wafering machine for performing the new and improved method for harvesting standing crop material is shown in the accompanying drawings, in which:

FIGURE 1 is a fragmentary side elevational view partly in vertical cross section through the heating chamber; and FIG. 2 is a fragmentary perspective view of a portion of the operating mechanism of the machine shown in FIG. 1.

While the invention is illustrated and described in connection with a particular embodiment, it is not thereby intended that the invention be limited thereto. On the contrary, it is intended to include all alternative constructions and modifications falling within the spirit and scope of the invention as expressed in the appended claims.

Referring more particularly to the drawings, there shown is a wafering machine which includes a wafering mechanism indicated generally at 10. The wafering mechanism is mounted upon the rear end portion of a frame 12 which is equipped with ground engaging wheels 14 by means of which it can be drawn through a field of hay or other forage crop. For cutting and comminuting the forage crop the illustrative machine is equipped with a rotary flail 16 which is disposed at the lower forward end of the machine. The flail 16 includes a transversely journalled central shaft 17 which mounts a series of blades 18. The outer end of each blade is of arcuate paddle form. The blades 18 are pivotally connected at 18a to the shaft 17 in longitudinally and angularly spaced relation. When the blades are in place and are rotated by the shaft 17 the paths traversed by their paddle-like outer ends overlap. The flail shaft 17 is rotated in a direction counterclockwise according to the view of FIGURE 1 so that the tips of the blades in the lower portion of their paths move in the direction of movement of the machine. Thus they engage, cut and lift the hay as the machine is drawn along the field.

The flail is enclosed within a housing 19 having a generally horizontal forwardly projecting hood 19a which serves to prevent forward and outward tossing of the cut hay as it is engaged by the flail blades 18.

Desirably the flail shaft 17 is rotated at relatively high speed and its blades serve not only to cut the standing hay but to chop the hay and, by virtue of centrifugal force, to throw it upwardly and rearwardly within the housing 19.

While the moisture content of standing forage crops varies widely, in general it comprises roughly 70% moisture by weight. Experience has demonstrated that in order to successfully store forage crop material for future use, this moisture content must be severely reduced—to the vicinity of 20% by weight. Heretofore it has been the practice to cut the standing forage crop and redeposit it on the field either loosely distributed or formed into windrows to permit moisture content reduction by the action of the sun and air. It is at once apparent that crop drying by this means requires considerable time, and in addition it requires the time and labor necessary for multiple traverse of the forage crop field.

The present invention therefore contemplates effecting forage crop moisture content reduction immediately upon the cutting of the crop. As hereinbefore described, the flail 16 serves not only the cutting function, but it chops and bruises the crop material and commingles stems and leaves. From this mass of comminuted forage material moisture is expressed. For this purpose the illustrative machine incorporates a pair of squeeze rolls 20. The squeeze rolls 20 are disposed at the upper rear portion of the flail housing 19 and extend transversely so as to receive the comminuted forage crop material and draw the same between them exerting considerable pressure thereon so as to squeeze moisture therefrom. To receive this moisture a trough 22 is provided. The trough extends entirely across the housing 19 beneath the lowermost one of the pair of squeeze rolls 20. To carry away the extracted juices the trough is equipped with a suitable drain 24.

Provision is made for further dehydrating the crop material subsequent to the action thereon of the squeeze rolls 20. For this purpose dehydration by heating is contemplated. Thus the illustrative machine includes a dehydrating chamber generally designated 26 into which the crop material is delivered by and from the squeeze rolls 20. The dehydrating chamber has disposed therein heating means which may be of any form, as will be apparent to one skilled in the art and, as shown for purposes of illustration, may include heat exchange units 28. For example, the machine can be equipped with a liquid fuel burner (not shown) which can be employed to heat a transfer medium such as steam or hot water. In such case the units 28, as shown, take the form of manifolded tube-type heat exchangers.

Because the wafering machine contemplated by the present invention is to be a mobile or field implement desirably its overall dimensions are minimized. Therefore, to provide a sufficiently long dwell time for the crop material within the heating chamber 26 means is provided to elongate its path of travel therethrough. Thus, there is disposed within the heating chamber 26 means defining an elongated, tortuous path to be traversed by the comminuted and squeezed forage crop material. As shown this means includes conveyors 30 and 32 of the endless belt type. The conveyor 30 is disposed to receive the ribbon of squeezed comminuted crop material as is delivered from the squeeze rolls 20. It is operated so that the uppermost pass of its endless belt moves in a rearward direction, thus carrying the ribbon of crop material adjacent and beneath the uppermost one of the heating units 28. The rear end of the conveyor 30 terminates in spaced relation to the rear wall 26a of the chamber 26, and when the ribbon of crop material reaches that end it is allowed to fall being directed downwardly by the rear wall of the chamber 26 onto the conveyor 32. The conveyor 32, which is similarly of the endless belt type is so operated that the upper pass of its belt moves in a forward direction. Crop material received thereon from the conveyor 30 is thus conveyed by the conveyor 32 beneath the lowermost one of the heat exchange units 28. The forward end of the conveyor 32 terminates in spaced relation to the forward wall 26b of the heating chamber 26, which wall separates the chamber 26 from the interior of the flail housing 19, and it is there equipped with a suitable deflector 33 to direct the crop material from the heating chamber 26.

Interposed between the wafering mechanism 10 and the heating chamber 26 is means for delivering the squeezed and dehydrated crop material from the heating chamber into the wafering mechanism. For this purpose the illustrative machine includes a conveyor 34 which is of endless belt form, the belt of which is equipped with a series of spaced transverse flights 35 which project outwardly therefrom. The forward end of the conveyor 34 extends beneath the dehydrating chamber 26 and is disposed in a position to receive the squeezed and dehydrated crop material as it is directed thereon by the deflector 33. The conveyor 34 is enclosed within a housing 36 which extends upwardly and rearwardly of the machine. At its upper end the housing 36 terminates in a hood 37 and the hood and the upper end of the housing are supported by suitable bracket 38 upon the frame 12. At its upper end the conveyor 34 delivers the crop material onto an inclined transfer chute 40 which is disposed within the hood 37 and by means of which the crop material is directed to a cross-feed conveyor 42. The cross-feed conveyor, in the illustrative device, includes an auger 43 which is disposed within a hopper 44. The hopper 44 opens into the wafering mechanism 10. As shown, the auger 43 includes a pair of helical flights 43a and 43b which are mounted upon and are rotatable with a shaft 45 that extends transversely through the housing 44.

The wafering mechanism 10 includes a housing 49 defining a wafering chamber 50. Within the wafering chamber is means defining a plurality of radially disposed die cells 52 arranged in annular array. The die cells 52 are of decreasing cross-section from their entrance ends toward their exit ends with the entrance ends defining the interior of the annulus and the exit ends defining the periphery of the annulus. The wafering mechanism 10 as shown also includes a pair of rollers 54 and means for mounting the same for traversing a path closely spaced and in juxtaposed relation with respect to the entrance ends of the die cells. Thus, the mounting means includes a pair of arms 56 which are fixed for rotation with the shaft 45. Successive passes of the rollers over the entrance ends of the stationary die cells 52 serves to compast forage crop material, which has been delivered by the auger 43 of the cross-feed conveyor 42 into the wafering chamber 50, into and through the cells 52 whereby it is formed into discreet blocks or wafers.

A suitable conveyor 60 is provided for collecting the wafers and for transferring them from the wafering mechanism 10. As shown this conveyor is of the endless-belt, cross-flight type having its forward end extending beneath the annulus of die cells of the wafering mechanism 10 and its rear end portion extending upward and rearwardly so as to deliver the collected wafers into a suitable receptacle such for example as a wagon (not shown) which may be trailed behind the machine.

Preferably, and as shown, the illustrative machine includes its own power source. For this purpose the machine is equipped with an internal combustion engine indicated generally at 65. Power from the engine 65 is delivered by way of a clutch 66, having an operator 67 projecting forwardly therefrom so as to be conveniently manipulated by the operator of a tractor drawing the machine through the field to a main power take-off pulley 68. The flail shaft 17 is adapted to be rotated by a drive belt 69 which is interposed between a pulley 70 and the main drive pulley 68. Rotation of the squeeze rolls 20 and of the conveyors 30, 32, and 34 is effected in the illustrative machine by suitable belt drive connections from the flail shaft 17. These connections include the drive belt 71 which is interposed between a sheave 71a on the flail shaft 17 and a corresponding sheave 71b on the shaft that mounts the lower one of the squeeze rolls 20. Similar belt and pulley connections, indicated generally at 72 and 73 are utilized to effect power transfer to operate the conveyors 30, 32 and 34.

Power for operating the cross-feed conveyor 42 derives from the main power take-off pulley 68 by means of a drive belt 75 which is trained about the pulley 68 and a drum 76. The drum 76 is rigid with the shaft 45 of the cross-feed conveyor 42. As hereinbefore noted, rotation of the shaft 45 not only effects rotation of the auger 43 but also of the roller assembly 54, 56. Power is derived from the shaft 45 also for operating the conveyor 60. For this purpose the shaft 45 at its outer end is equipped with a suitable pulley 78 which is belted to a drive pulley 79 that is carried by the shaft of a drive roller for the conveyor 60.

As shown, means is provided in the illustrative machine for adjusting the moisture content of the hay in the event that it was over-dried. This same means, it is contemplated, can be employed for the addition of other nutrients. Thus the illustrative device is equipped with a manifolded valving mechanism generally indicated at 80 with suitable fluid connections 81 whereby such additives can be introduced into the hopper 44 of the cross-feed conveyor.

I claim as my invention:

1. In a machine for harvesting standing forage crops, the combination comprising, means for cutting and comminuting the crop material, a pair of squeeze rolls for receiving the crop material from said cutting and comminuting means and expressing moisture therefrom, an enclosed chamber, a plurality of vertically spaced heating elements disposed within said chamber, a plurality of oppositely directed, vertically spaced conveyors disposed within said chamber for conveying the crop material from said squeeze rolls and along an elongated, tortuous path within said chamber adjacent said heating elements for further dehydrating the crop material, means for collecting and carrying away the moisture expressed from the crop material by said squeeze rolls, a wafering mechanism, a transfer conveyor for receiving wafered material therefrom, said wafering mechanism compressing the dehydrated crop material received from said chamber and delivering it to said transfer conveyor, and drive means including a main power coupling for simultaneously driving said cutting and comminuting means, said squeeze rolls, said spaced conveyors, said wafering mechanism and said transfer conveyor.

2. The combination defined in claim 1 including a manifolded valving mechanism for selectively introducing liquid to the dehydrated crop material prior to wafering thereof.

3. The construction defined in claim 1 wherein each of said heating elements is in the form of a manifolded tube-type heat exchanger adapted to receive and communicate a heated fluid for further dehydrating the crop material within said chamber.

References Cited by the Examiner

UNITED STATES PATENTS

| | | | |
|---|---|---|---|
| 2,651,269 | 9/1953 | French | 56—1 X |
| 2,716,317 | 8/1955 | McClellan | 56—1 |
| 2,756,554 | 7/1956 | Diehl et al. | 56—1 |
| 2,764,951 | 10/1956 | Fisher. | |
| 2,798,444 | 7/1957 | Meakin | 107—14 |
| 2,887,718 | 5/1959 | Curran et al. | |
| 2,909,881 | 10/1959 | Callahan | 56—1 |
| 2,999,346 | 9/1961 | Mathews | 56—1 |
| 3,010,150 | 11/1961 | Meakin | 107—8 X |
| 3,015,199 | 1/1962 | McKeon et al. | 56—1 |

FOREIGN PATENTS 1,250,174    11/1960    France.

ABRAHAM G. STONE, *Primary Examiner.*

CARL W. ROBINSON, ANTONIO F. GUIDA, T. GRAHAM CRAVER, *Examiners.*